United States Patent
Kamiya et al.

(10) Patent No.: US 7,934,050 B2
(45) Date of Patent: Apr. 26, 2011

(54) MICROCOMPUTER FOR FLASH MEMORY REWRITING

(75) Inventors: Masahiro Kamiya, Nishio (JP);
Kyouichi Suzuki, Toyahashi (JP); Naoki Itoh, Nagoya (JP); Hideaki Ishihara, Okazaki (JP)

(73) Assignee: DENSO CORPORATION, Kariya (JP)

( * ) Notice: Subject to any disclaimer, the term of this patent is extended or adjusted under 35 U.S.C. 154(b) by 458 days.

(21) Appl. No.: 12/000,001

(22) Filed: Dec. 6, 2007

(65) Prior Publication Data

US 2008/0140920 A1 Jun. 12, 2008

(30) Foreign Application Priority Data

Dec. 7, 2006 (JP) ................................. 2006-330799
Aug. 1, 2007 (JP) ................................. 2007-200839

(51) Int. Cl.
*G06F 13/00* (2006.01)
(52) U.S. Cl. .................... 711/103; 711/E12.001; 714/18
(58) Field of Classification Search ........... 711/E12.001; 714/18
See application file for complete search history.

(56) References Cited

U.S. PATENT DOCUMENTS 5,694,538 A * 12/1997 Okazaki et al. ................. 714/15
6,182,004 B1 1/2001 Komori
6,622,200 B1 * 9/2003 Hasbun et al. ................. 711/103
6,883,060 B1 * 4/2005 Hayama ........................ 711/103
2003/0189860 A1 * 10/2003 Takeuchi et al. .............. 365/200
2004/0088473 A1 * 5/2004 Ogle ............................... 711/100
2005/0013154 A1 * 1/2005 Honda et al. .................. 365/145
2006/0218340 A1 9/2006 Fujita et al.

FOREIGN PATENT DOCUMENTS

JP A-2004-102893 4/2004
JP A-2005-321843 11/2005

OTHER PUBLICATIONS

Notice of Reason for Refusal mailed Mar. 30, 2010 in corresponding Japanese Patent Application No. 2007-200839 (and English translation).

* cited by examiner

*Primary Examiner* — Matt Kim
*Assistant Examiner* — John P Fishburn
(74) *Attorney, Agent, or Firm* — Posz Law Group, PLC (57) ABSTRACT

A microcomputer and method are provided capable of restarting a rewrite program without the need for changing a mode using an external terminal when rewriting nonvolatile memory fails. A CPU of a microcomputer executes a rewrite program to clear FLASH status 0 of flash memory and rewrite all areas in it. The CPU finally writes a rewrite completion code to FLASH status 0. The CPU executes a determination program to read FLASH status 0 of the flash memory. The CPU reads ID status information when read data does not match the rewrite completion code. The CPU re-executes the rewrite program when the data matches ID status information.

9 Claims, 12 Drawing Sheets

MICROCOMPUTER FOR FLASH MEMORY REWRITING

CROSS REFERENCE TO RELATED APPLICATIONS

The present invention is based on and claims priority to unpublished Japanese Patent Application No. 2006-330799 filed on Dec. 7, 2006 and unpublished Japanese Patent Application No. 2007-200839 filed on Aug. 1, 2007, the contents of each of the identified applications being incorporated herein by reference.

BACKGROUND OF THE INVENTION

1. Field of the Invention

The present invention relates to an on-board or on-chip microcomputer that can rewrite first nonvolatile rewritable memory for storing a user program.

2. Description of Background Art

Figure 12:
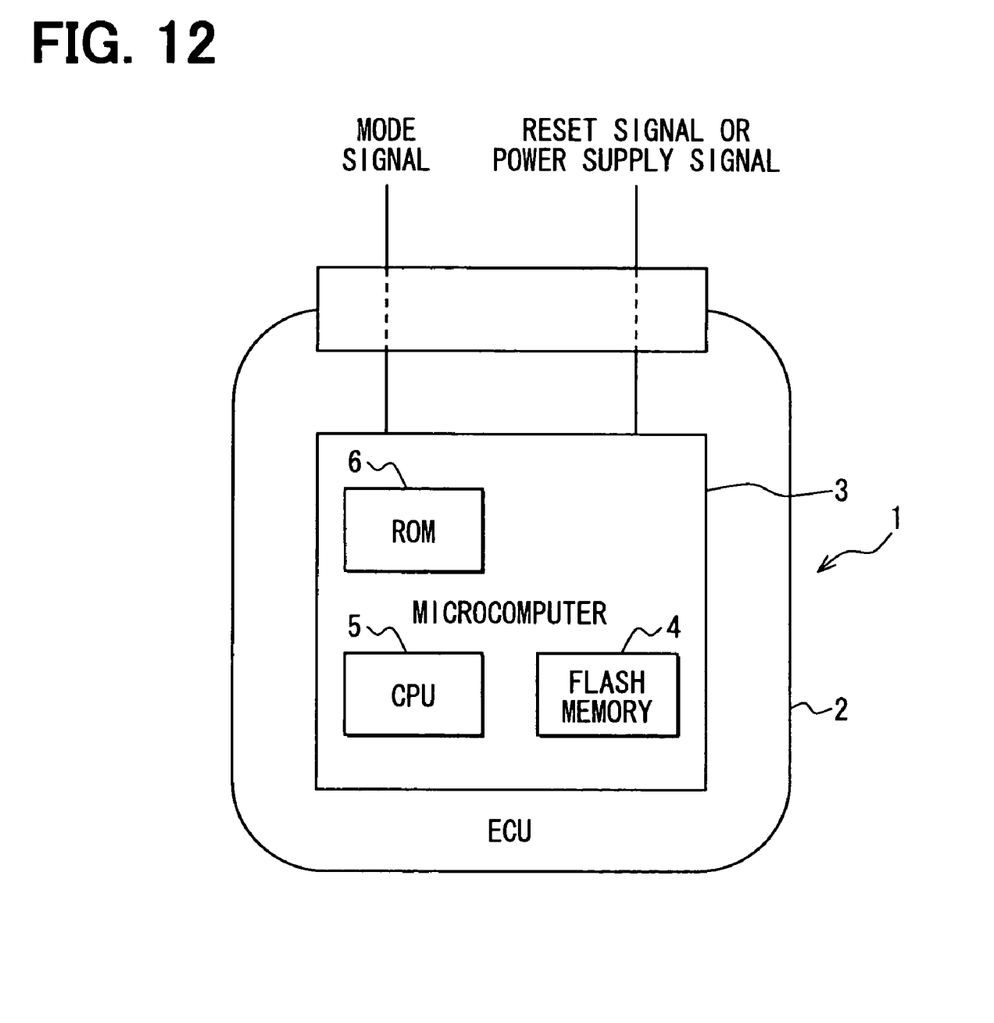
FIG. 12 is a diagram illustrating a conventional ECU with external terminals for a mode signal and a reset signal.

FIG. 12 shows an electronic control unit (ECU) for vehicle control. An ECU 1 includes a microcomputer 3 and the other peripheral circuits (not shown) mounted on a substrate 2. A control program for the microcomputer 3 may be stored in rewritable nonvolatile memory such as flash memory 4 and may be executed by a central processing unit (CPU) 5. The control program is rewritten as needed for debugging or upgrading.

In order to rewrite the flash memory 4, the microcomputer 3 is set to a rewrite mode and is reset. For example, the microcomputer may be configured to be reset externally. The microcomputer 3 starts a rewrite program stored in ROM 6 of the microcomputer 3. The CPU 5 writes data transferred from an external rewriting apparatus (not shown). For example, the above described flash memory rewriting procedure is disclosed in Japanese Patent Application No. JP-2000-20178 A1.

It should be noted that in various circumstances, a rewrite may fail due to a power supply voltage drop that occurs during the process of flash memory rewriting or due to a disconnection of a communication line between the microcomputer and a rewriting apparatus. In such case, resetting the microcomputer can start a rewrite program and can be repeated to retry the rewrite.

In a typical vehicle control scenario, there is no need for resetting an ECU that is already operating in place, for example, on the vehicle. Further, providing an extra terminal for reset would be redundant and would increase costs. It would be preferable therefore to configure the ECU so as to use only a power-on reset that is already provided.

However, an ECU already operating in place is continuously supplied with power from a vehicle battery and no power-on reset occurs. Accordingly, the microcomputer can not be changed to a specific operation mode such as "rewrite mode." Further, a dedicated terminal for mode change would be undesirable since it would increase costs.

A configuration without a reset and mode switch capability precludes the ability to start the rewrite program. Thus, when the flash memory rewriting fails, it cannot be retried.

For example, the ECU may execute a user program, such as an user program, embedded program, software program, or the like as will be appreciated by one of ordinary skill. The user program is stored in the flash memory during normal operation and the ECU can detect that a rewrite instruction is supplied from the external rewriting apparatus. In the above described case, the ECU can start the rewrite program and perform a rewrite of the user program at least once. When the rewrite fails, however, the user program cannot be normally executed thereafter and the CPU of the ECU cannot detect the rewrite instruction. For the above reasons, conventionally external reset and mode switch terminals have been required and therefore it has been difficult to decrease the number of microcomputer terminals.

SUMMARY OF THE INVENTION

The present invention has been made in consideration of the foregoing. It is therefore an object of the invention to provide a microcomputer capable of restarting a rewrite program without the need for changing a mode using an external terminal when a rewriting of a nonvolatile memory fails.

According to various exemplary embodiments that include, for example, a microcomputer, a CPU executes a rewrite program, clears a rewrite check area of a first memory, rewrites all areas in the memory, and writes a rewrite completion code to the rewrite check area. The CPU executes a determination program to read a rewrite check area of the first memory.

A match between the data in the check area and the rewrite completion code, normally indicates that the write to the first memory is complete. The CPU then executes a user program. When the data does not match the rewrite completion code, the write to the first memory can be considered unsuccessful, after which the CPU re-executes the rewrite program.

The CPU can be configured, for example, to first execute the determination program when the power-on reset state of the microcomputer is released. When referencing the rewrite check area, the CPU can determine whether the user program is normally rewritten in the first memory. The CPU can re-execute the user program when the rewrite fails. Accordingly, the microcomputer need not have an external terminal such as a reset terminal or a mode setup terminal so as to retry the rewrite for the first memory. It is thereby possible to miniaturize a package for the microcomputer and reduce costs.

In accordance with an exemplary embodiment of a microcomputer, the CPU executes the rewrite program and writes the same ID code to two rewrite enable ID areas of the first memory. The CPU executes the determination program and reads first and second rewrite enable ID areas when data read from the rewrite check area does not match the rewrite completion code. The CPU executes the rewrite program when data read from both areas matches the ID code. As mentioned above, a match for the ID code ensures that the program writes to the first memory with a correct access right thereby preventing unauthorized access.

In accordance with another exemplary embodiment of a microcomputer, the CPU executes the rewrite program and writes the same ID code to first and second rewrite enable ID areas provided for two blocks of the first memory. The CPU executes the determination program and reads the first and second rewrite enable ID areas for the two blocks when data read from the rewrite check area does not match the rewrite completion code. The CPU executes the rewrite program when both read data for one of the blocks match the ID code.

It should be noted that the two blocks in the first memory are not erased or written simultaneously. When a rewrite to first memory fails, one of the blocks may not be rewritten depending on timing, particularly when the ID code cannot be confirmed. To solve such a problem, the rewrite program writes the same ID code to the two blocks. Checking for a match between each block and the ID code can reliably confirm a match for either block.

In accordance with still another exemplary embodiment of a microcomputer, the CPU executes a partial rewrite program, clears a partial rewrite check area of the first memory, and rewrites the memory from the beginning position to the end position. The CPU finally writes a partial rewrite completion code to the partial rewrite check area. The CPU executes the determination program and references the flag storage area when data read from the rewrite check area of the first memory matches the rewrite completion code. The CPU reads the partial rewrite check area of the first memory when enabled.

The CPU executes the user program when read data matches the partial rewrite completion code. The CPU executes the partial rewrite program when the data does not match the partial rewrite completion code. The same effect as claim 1 is also available even when writing only part of the first memory fails.

In accordance with still another exemplary embodiment of a microcomputer, the CPU executes the rewrite program, writes the same ID code to first and second rewrite enable ID areas of the first memory, enables or disables a partial write to the flag storage area, and specifies areas for writing the beginning and end positions. The CPU executes the determination program and reads the first and second rewrite enable ID areas when data read from the rewrite check area matches the rewrite completion code. The CPU references the flag storage area when both read data match the ID code. A match for the ID code can be also confirmed when the first memory is partially rewritten.

In accordance with still another exemplary embodiment of a microcomputer, the rewrite check area as described above can be used as a total rewrite check area. The first memory is assigned with a minimum write unit used to contain an area for storing a flag to enable or disable the partial rewrite and areas for writing beginning and end positions as well as the total rewrite check area as described. The first memory is totally or partially rewritten. The minimum write unit can signify, for example, a minimum size of data written to the first memory during one write cycle and depends on microcomputer design specifications.

The CPU executes the determination program, reads a total rewrite check area of the first memory, and executes the total rewrite program when read data does not match the total rewrite completion code. The CPU references the flag storage area when the data matches the total rewrite completion code. The CPU reads the partial rewrite check area when enabled. The CPU executes the user program when read data matches the partial rewrite completion code. The CPU executes the partial rewrite program when the data does not match the partial rewrite completion code.

Information about the partial rewrite to the first memory becomes meaningful after the total rewrite is completed at least once. Since the minimum unit of writing is used for the partial rewrite information and the total rewrite check area, the amount of information can be reduced and can be more effectively used. As a result, execution of the determination program can be completed in a shorter time.

In accordance with still another exemplary embodiment of a microcomputer, the partial rewrite check area is assigned with a minimum write unit used to contain an area for storing a flag to enable or disable the partial rewrite and areas for writing beginning and end positions for an area to be partially written next. One or more partial rewrite check areas are provided. The partial rewrite can be performed on multiple blocks whose addresses are discontiguous.

In accordance with still another exemplary embodiment of a microcomputer, the CPU executes the determination program at reset time. When a reset condition is released, the CPU can check whether the first memory is written normally.

When a write is incorrect or data is garbled, the CPU can stop the user program to prevent it from executing abnormally.

In accordance with yet another exemplary embodiment of a microcomputer, the CPU executes the determination program when a low-power consumption mode is released to enable a wake-up state. At the wake-up time, the CPU can check whether the first memory is normally written. When a write is incorrect or data is garbled, the CPU can stop the user program to prevent it from executing abnormally.

BRIEF DESCRIPTION OF THE DRAWINGS

Other objects, features and characteristics of the present invention will be appreciated and become apparent to those of ordinary skill in the art and all of which form a part of the present application. In the drawings.

DETAILED DESCRIPTION OF THE EXEMPLARY EMBODIMENTS

Embodiments of the present invention, including a preferred embodiment, will now be described in further detail with reference to the accompanying drawings.

First Embodiment

A first embodiment of the present invention will be described with reference to FIG. 1 through FIG. 5. According to various exemplary embodiments of the invention, the configuration of a microcomputer 11, which can be included in an ECU for vehicle control as described herein, includes, for example, a CPU 12, a read only memory (ROM) 13 also referred to herein as a second memory, random access memory (RAM) 14, a flash memory 15 also referred to herein as a first memory, a flash controller 16, and a communication circuit 17. The above described components are connected to each other via an address bus 18 and a data bus 19. It will be appreciated that flash memory 15 can include various types of flash memory that are widely available, such as but not limited to NOR gate flash memory, NAND gate flash memory, or the like as would be appreciated by one of ordinary skill in the art.

Figure 5:
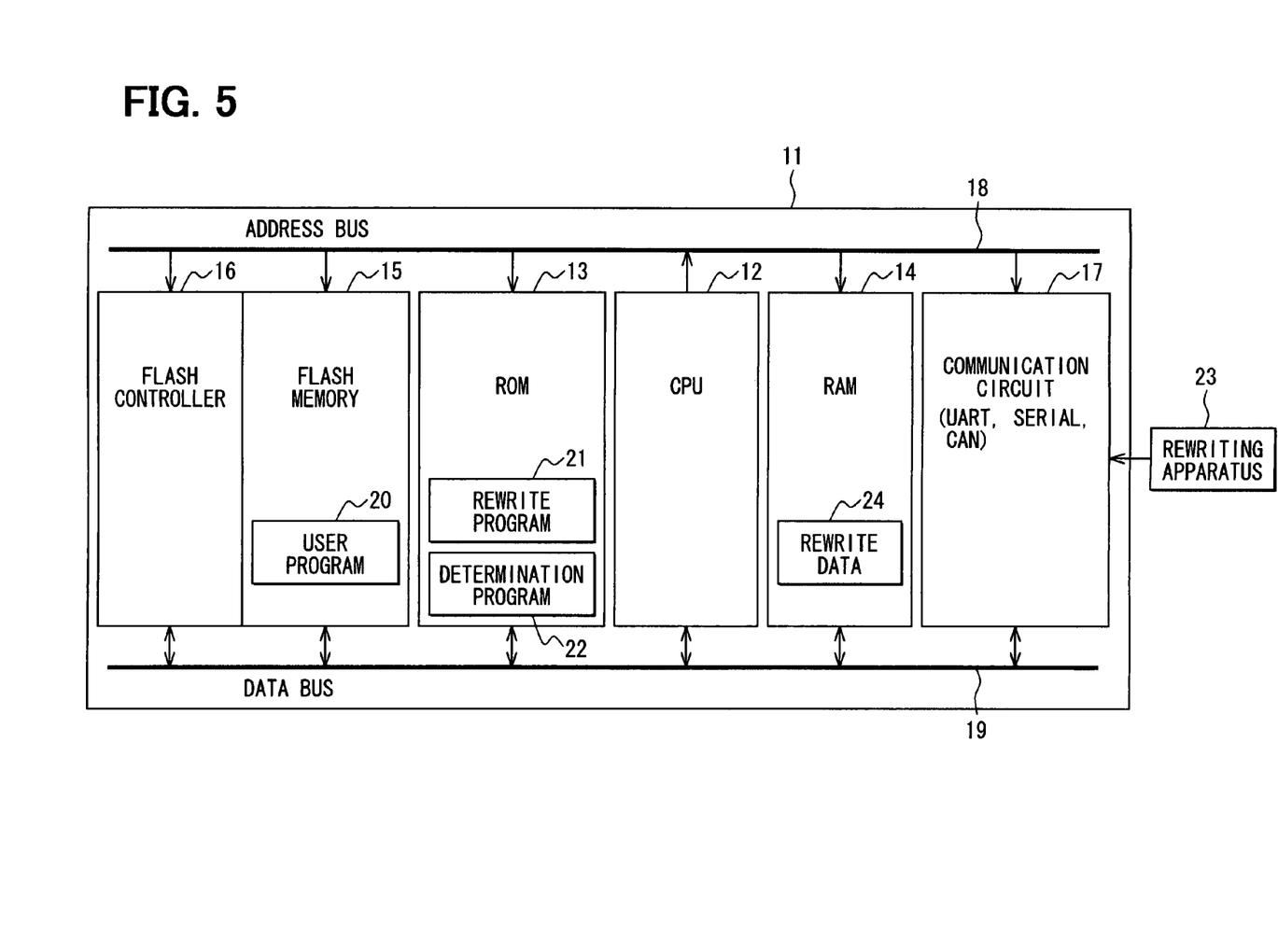
FIG. 5 is a block diagram illustrating an exemplary configuration of a microcomputer in accordance with various embodiments.

The flash memory 15 stores a user program 20 that is executed by the CPU 12 functioning as the ECU. The ROM 13 stores a rewrite program 21 and a determination program 22. The rewrite program 21 writes the user program 20 to the flash memory 15. The determination program 22 determines status of the flash memory 15 to determine which of the user program 20 and the rewrite program 21 is to be executed. When the CPU 12 accesses the flash memory 15, the flash controller 16 manages blocks or corrects errors in the flash memory 15.

The communication circuit 17, for example, can be a universal asynchronous receiver transmitter (UART) that provides a communication interface compliant with various protocols for serial communication and network communication such as may be associated with interior local area networks (LANs) including a controller area network (CAN). The communication circuit 17 communicates with an external rewriting apparatus 23 to rewrite the user program 20, also referred to herein as an application, in the flash memory 15. The rewriting apparatus 23 transfers rewritten data 24 that is then written to the RAM 14.

It is assumed that a ROM writer or the like can be used to initially write the user program 20 to the flash memory 15 in advance. Alternatively, the flash memory 15 can also be initially written by branching to the rewrite program 21 instead of the user program 20 when a determination at S6 results in NO as shown for example in FIG. 1 of the drawings, and which will be described in greater detail hereinafter.

Figure 2:
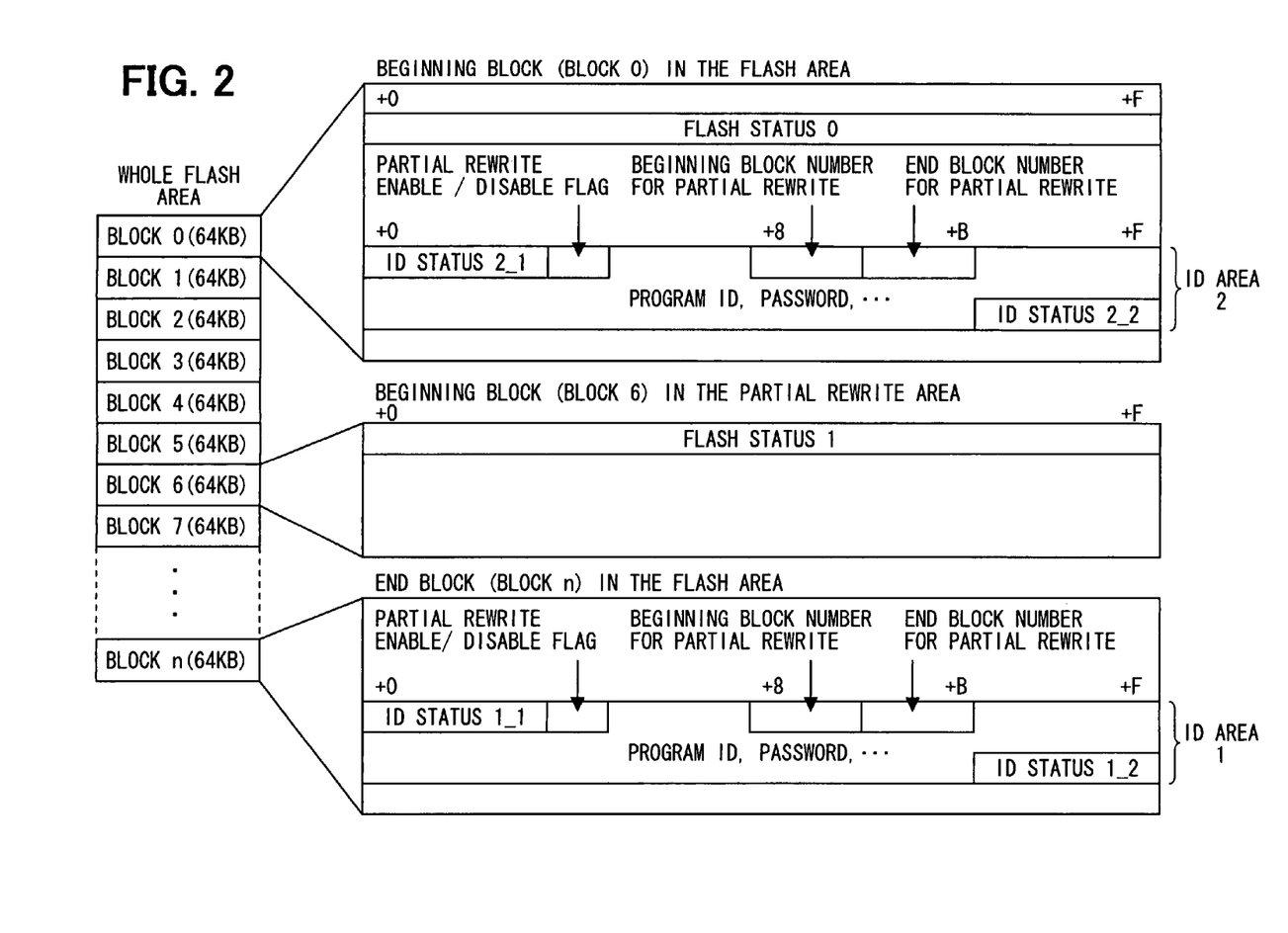
FIG. 2 is a memory map illustrating the memory contents of a flash memory in accordance with an exemplary embodiment.
Figure 3:
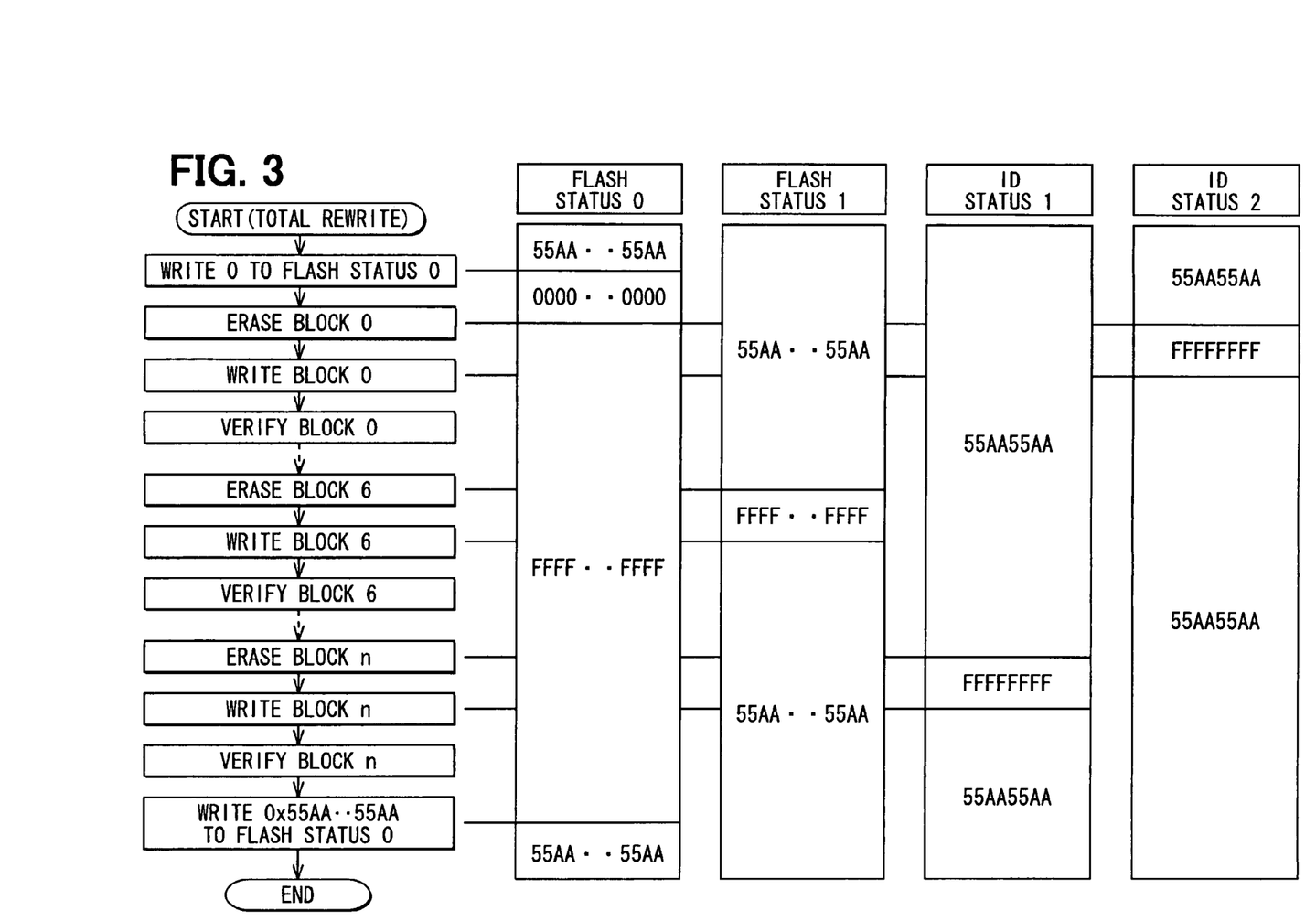
FIG. 3 is a functional diagram illustrating an exemplary total rewrite process performed by a rewrite program and corresponding status changes of the flash memory.

As shown in FIG. 2, the flash memory 15 is divided into blocks 0 through n, with each block having a size of, for example, 64 kilobytes. As will be appreciated, the rewrite process is performed on a block basis. FIG. 3 shows a total rewrite process performed by the rewrite program 21 and status changes of the flash memory 15 corresponding to the rewrite process.

Referring again to FIG. 2, beginning block 0 contains, for example, in a rewrite check area, a FLASH status 0 area, which is referred to hereinafter as FLASH status 0, and ID area 2. A certain value can be written to FLASH status 0 indicating total rewrite completion. End block n contains ID area 1. Block 6 is defined as a beginning block for partial rewrite, for example. Block 6 contains a FLASH status 1 area, which is referred to hereinafter as FLASH status 1, and which can be located for example, in a partial rewrite check area, with a certain value written therein indicating partial rewrite completion. It will be appreciated that the term FLASH status area 0, 1 and the like, reference is made to an area, typically 16 Bytes in length total in length that can be located in any suitable place within the flash memory 15, such as at a 16 Byte boundary or the like. Accordingly, for example, FLASH status area 0 need not be located at the first block of the flash memory 15 although it could be so located.

When other information is present in the FLASH status area, such as rewrite enable flags and the like, the effective size of the FLASH status completion code portion, that is, the area where the certain value indicating completion will be written, as will be described in greater detail hereinafter, will be reduced. Accordingly, the length of the FLASH status area plus any rewrite enable flags or additional information will not exceed or be less than, for example, a minimum write unit size.

A given hexadecimal data value such as 55AA . . . 55AAH is written to FLASH status 0 when the total rewrite process is complete. Similarly, for example, 55AA . . . 55AAH is written to FLASH status 1 when partial rewrite process is complete. The same data can be written to the ID areas 1 and 2, which areas are used for verification to be described in greater detail hereinafter.

ID areas 1 and 2 store IDs and passwords for permitting the flash memory 15 to be rewritten. Prior to rewriting, an authentication can be performed using the ID identifying, for example, the user program and a password indicating that the rewrite is authorized. The beginning and the end of the area contains the same ID codes or ID status values 1 and 2. The ID area further contains a flag storage area for storing a flag indicating enabling or disabling partial rewrite, and areas to store starting and end block numbers for partial rewrite, a program ID, and a password.

(Total Rewrite Process)

During the total rewrite process shown, for example, in FIG. 3, the CPU 12 clears block 0 by first writing data 0000 . . . 0000 to FLASH status 0 to clear any previous indication that a rewrite process is complete. The CPU 12 then erases, writes, and verifies blocks 0, 6, and n in order. The CPU 12 finally writes data 55AA . . . 55AA to FLASH status 0 to complete the clearing process.

Referring again to FIG. 2, the ID areas 1 and 2 contain data concerning the partial rewrite such as whether the partial rewrite is enabled or disabled and the beginning and end block numbers depending on whether the partial rewrite is performed later.

FIG. 3 shows changes in data written to FLASH status areas 0 and 1 and ID status areas 1 and 2 as the total rewrite process progresses. When the flash memory 15 is previously written or rewritten, FLASH status 0 will contains data 55AA . . . 55AA. Data 0000 . . . 0000 is then written. Erasing the next block 0 changes the contents to a data value of FFFF . . . FFFF, which value is maintained during the rewrite operation. The final write process returns the data to 55AA . . . 55AA. During the total rewrite process, therefore, it is apparent that FLASH status 0 contains a value other than 55AA . . . 55AA.

FLASH status 1, when previously written or rewritten, also contains initial value 55AA . . . 55AA. Erasing block 6 changes the value of FLASH status 1 to FFFF . . . FFFF. The next write returns the value of FLASH status 1 to 55AA . . . 55AA. ID status 2_1 and ID status 2_2 in ID area 2 also contain initial value 55AA . . . 55AA. Erasing block 0 changes the value to FFFF . . . FFFF. The next write returns the value of ID status 2_1 and ID status 2_2 to 55AA . . . 55AA. Similarly, ID status 1_1 and ID status 1_2 in ID area 1 also contain initial value 55AA . . . 55AA. Erasing block n changes the value of ID status 1_1 and ID status 1_2 to FFFF . . . FFFF. The next write returns the value of ID status 1_1 and ID status 1_2 to 55AA . . . 55AA.

When a write error is detected in verification during the total rewrite process, the CPU 12 generates an internal reset at that point to start execution from a reset vector. The CPU 12 executes the determination program 22, such as the flash status determination process shown in FIG. 1. Alternatively, a timer may be used to count a time from the beginning to the end of the total rewrite process. In such a scenario, the CPU 12 may generate an internal reset in response to a timeout condition caused when the process does not terminate within a specified time.

Figure 1:
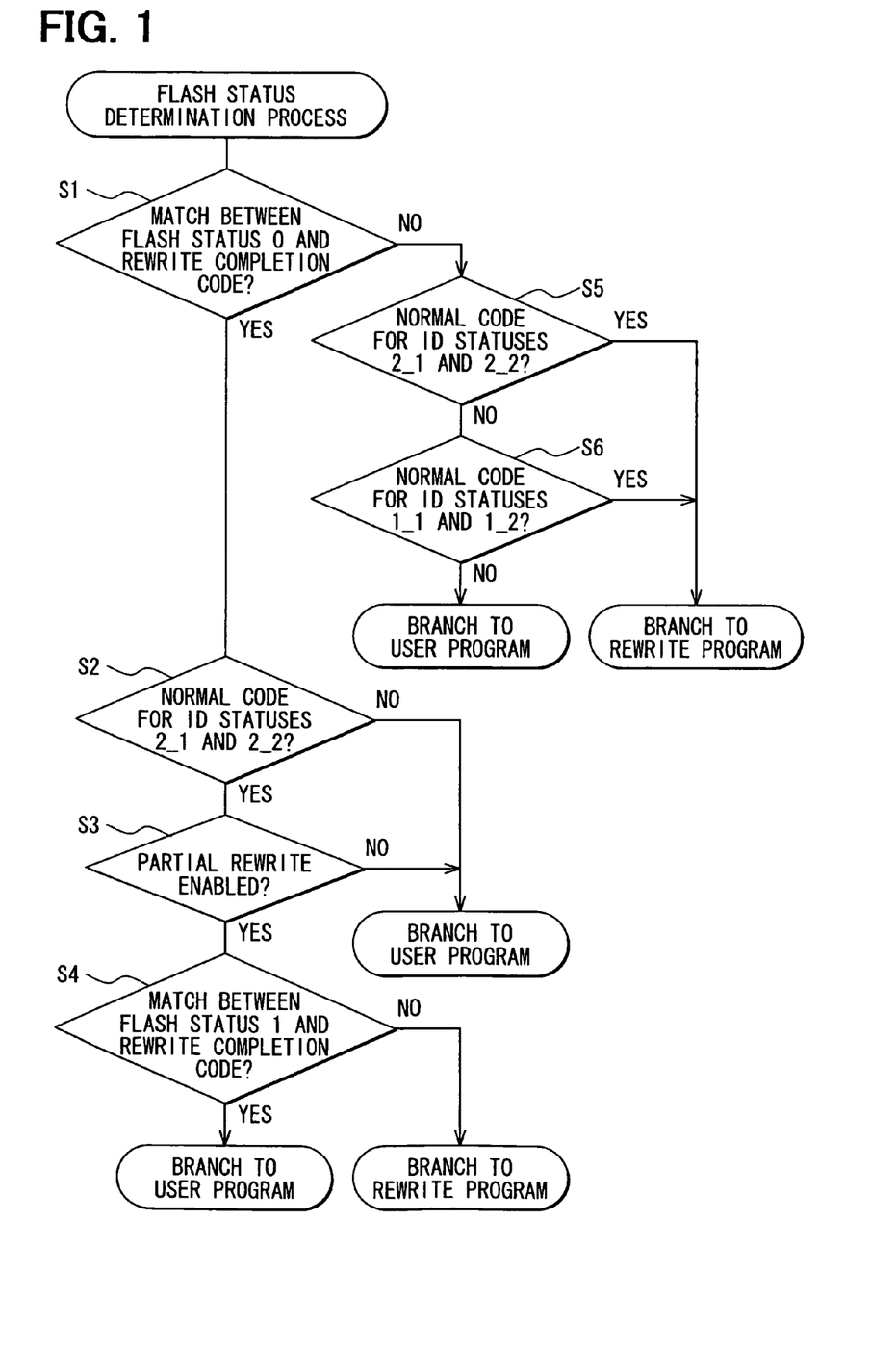
FIG. 1 is a flowchart illustrating a flash status determination process according to a first embodiment of the invention.

With regard to the flash status determination process, the CPU 12 reads FLASH status 0 from the flash memory 15 and determines at S1 whether the data value matches rewrite completion code 55AA . . . 55AA. When the data value for FLASH status 0 does not match the rewrite completion code, corresponding, for example, to a NO at S1, the CPU 12 determines at S5 whether both ID status 2_1 and ID status 2_2 in ID area 2 contain the normal code 55AA . . . 55AA. When both ID status 2_1 and ID status 2_2 contain the normal code corresponding to YES at S5, the CPU 12 determines that ID area 2 contains effective ID and password. The CPU 12 starts executing the rewrite program 21, which authenticates the ID and the password written to the ID area 2. When an authentication result is successful, the rewrite program 21 starts a process according to the flowchart in FIG. 3.

When the determination at S5 results in NO, the CPU 12 proceeds to S6 and determines whether both ID status 1_1 and ID status 1_2 in ID area 1 contain normal code 55AA . . . 55AA. When both contain the normal code (YES), the CPU 12 determines that ID area 1 contains effective ID and password. The CPU 12 starts executing the rewrite program 21.

As shown in FIG. 3, if one of ID areas 2 and 1 is not written correctly the total rewrite process may terminate. The ID status of the incorrectly written area shows FFFF . . . FFFFF. Normal data is not written. However, normal data is written to the other ID area. The effective ID area is selected.

When neither ID area 2 nor 1 contains normal data, corresponding to NO at S6, the CPU 12 executes the user program 20 with an assumption of an abnormal state where initial writing of the user program 20 was unsuccessful or that a physical part of the flash memory 15, bus 18, or bus 19 has failed.

When the rewrite is executed in an abnormal state, it is assumed that abnormal data may be written to the flash memory 15. Control branches to the user program 20. If a memory check routine provided for the user program 20 is normal, the memory check routine performs a check sum on the flash memory 15. If an error is found as a result, error processing is performed. In the case where a physical problem exists, the flash memory 15 cannot be written normally and the suspected part may be replaced as needed.

(Partial Rewrite Process)

Figure 4:
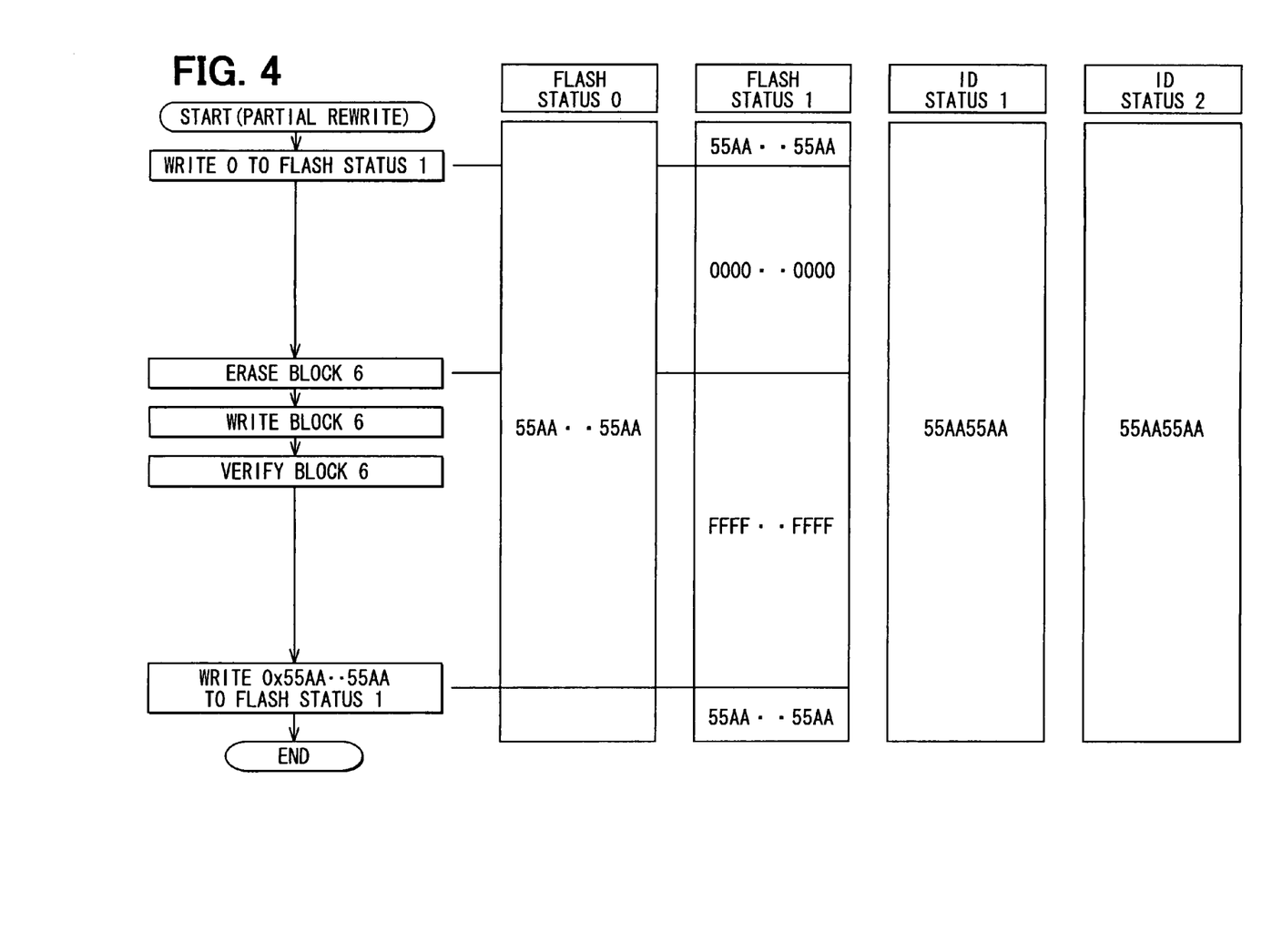
FIG. 4 is a functional diagram illustrating an exemplary partial rewrite process performed by a rewrite program and corresponding status changes of the flash memory.

In FIG. 4, which shows an exemplary partial rewrite process for the flash memory 15, the user program 20 is partially rewritten, for example in connection with an on site software upgrade, or the like, with the microcomputer 11 of the ECU turned on. While the microcomputer 11 is executing the user program 20, the rewriting apparatus 23 is connected and issues a partial rewrite instruction. The user program 20 identifies the partial rewrite instruction and begins performing the partial rewrite process. It should be noted that in accordance with the exemplary partial rewrite process, Block 0 of the flash memory 15 is typically reserved or otherwise predetermined to not be partially rewritten, particularly since Block 0 of the flash memory 15 will typically contain information associated with total rewrites.

FIG. 4 shows how block 6 is partially rewritten, for example using a partial rewrite program that is most typically part of the rewrite program 21, although in some variations, the partial rewrite program could be separately provided. In order to identify block 6 as the block for rewriting, as will be understood with reference to FIG. 2, the beginning and end block numbers in the ID area 2 are set to the value 6 or some value corresponding to block 6. The CPU 12 clears block 6 by writing data 0000 . . . 0000 to FLASH status 1. The CPU 12 erases, writes, and verifies block 6 in that order. The CPU 12 finally writes data 55AA . . . 55AA to FLASH status 1 to complete the partial rewrite process.

FIG. 4 shows changes in data written to FLASH status 0 and FLASH status 1 and ID status 1 and ID status 2 in ID areas 2 and 1 as the partial rewrite process progresses. Since only block 6 is rewritten, data for FLASH status 0 and ID status 1 and ID status 2 in ID areas 2 and 1 remains 55AA . . . 55AA.

Since the flash memory 15 is already written, FLASH status 1 contains data 55AA . . . 55AA. Initially, data 0000 . . . 0000 is written. Erasing block 6 changes the value of FLASH status 1 to FFFF . . . FFFF. The next write is not performed on FLASH status 1 to maintain the above-mentioned data value. The final write process returns the data to 55AA . . . 55AA. During the partial rewrite process, FLASH status 0 contains a value other than 55AA . . . 55AA.

When a write error is detected, for example during a verification of block 6 during the partial rewrite process, the CPU 12 generates an internal reset at that point to start execution from a reset vector. The CPU 12 executes the flash status determination process shown, for example, in FIG. 1. In such a case, the data value for FLASH status 0 matches the rewrite completion code. The CPU 12 assumes a result at S1 to be YES. The CPU 12 further determines at S2 whether the normal code is contained in both ID status 2_1 and 2_2 of ID area 2.

When the status of the ID area 2 indicates the normal code, corresponding to YES at S2, the CPU 12 determines at S3 whether the area enables the partial rewrite. When the partial rewrite is enabled, corresponding to YES at S3, the CPU 12 reads FLASH status 1 from block 6 and determines at S4 whether the data value matches rewrite completion code 55AA . . . 55AA. When the data value does not match rewrite completion code, corresponding to NO at S4, control branches to the rewrite program 21 whereupon the CPU 12 retries the partial rewrite process shown, for example, in FIG. 4.

It should be noted that the partial rewrite process does not rewrite block 0. When the determination at S2 results in a NO, an abnormal state is indicated whereupon control branches to the user program 20 to execute, for example, the memory check routine. ID area 1 of each block n need not be confirmed as shown for example, in connection with S5 and S6.

The CPU 12 can also generate an internal reset when, for example, a watchdog timer detects abnormal execution or when a bus error occurs. In such case, the determinations in FIG. 1 can be performed. It should be noted that when the flash memory 15 is normally rewritten, all the determinations at S1 through S4 will result in a YES resulting in the CPU 12 branching to the user program 20 for execution. When the partial rewrite process is disabled corresponding to NO at S3, the CPU 12 branches to the user program 20 without passing to S4.

According to the present embodiment, CPU 12 of the microcomputer 11 executes the rewrite program 21 to clear FLASH status 0 of the flash memory 15 and rewrite all areas in the flash memory 15. The CPU 12 finally writes the rewrite completion code 55AA . . . 55AA to FLASH status 0. While the value 55AA . . . 55AA is described herein for illustrative purposes, it will readily be appreciated that values other than 55AA . . . 55AA can be used for the rewrite completion code including, for example, a cyclic redundancy code (CRC), checksum, or the like associated with the data that is rewritten. The CPU 12 executes the determination program 22 to read FLASH status 0 of the flash memory 15. When the data does not match the rewrite completion code, the CPU 12 re-executes the rewrite program 21.

When the CPU 12 executes the determination program 22 to reference FLASH status 0, the CPU 12 can determine whether the user program 20 in the flash memory 15 is normally rewritten and can retry the rewrite if not. Accordingly, since the microcomputer 11 need not have an external terminal or terminals such as a reset terminal or a mode setup terminal to cause a reset and rewrite for the flash memory 15, it is possible to miniaturize a package for the microcomputer 11 and thereby reduce costs.

The CPU 12 executes the rewrite program 21 to write the same ID code to ID status 2_1 and ID status 2_2 of the flash memory 15. The determination program 22, when executed, reads ID status 2_1 and ID status 2_2 when data for FLASH status 0 does not match the rewrite completion code. When data for ID status values matches the ID code, the CPU 12 executes the rewrite program 21. It is possible to confirm writing to the memory 15 with a correct access right and prevent an unauthorized access.

Further, the same ID code is written to ID status 2 and ID status 1 in blocks 0 and n of the flash memory 15. The CPU 12 executes the determination program 22. When data for FLASH status 0 does not match the rewrite completion code, the CPU 12 reads ID status 2 and ID status 1 from blocks 0 and n. When read data for both ID status values matches the ID code in one of the blocks, the CPU 12 executes the rewrite program 21. Even when the write to the flash memory 15 fails, one of the blocks can be used to reliably confirm a match for the ID code.

The CPU 12 executes the partial rewrite process, i.e., part of the rewrite program 21, to first clear FLASH status 1 of the flash memory 15. The CPU 12 rewrites the memory from the beginning to the end. The CPU 12 finally writes the partial rewrite completion code 55AA . . . 55AA to FLASH status 1.

The CPU 12 executes the determination program 22. When data for FLASH status 1 matches the rewrite completion code at S4, the CPU 12 references a flag storage area to read FLASH status 1 when enabled. When the read data does not match the partial rewrite completion code, corresponding to NO at S4, the CPU 12 executes the partial rewrite process. It should be noted that the same effect as for rewriting all areas is available when writing part of the flash memory 15 fails. Such a capability is advantageous when the user program 20 is partially rewritten in connection with, for example, an on site software upgrade, or the like.

As mentioned above, the CPU 12 executes the rewrite program 21 to write the same ID code to ID status 2_1 and ID status 2_2 of the flash memory 15. In addition, the CPU 12 enables or disables a partial write to the flag storage area and specifies areas for writing beginning and end positions. The CPU 12 then executes the determination program 22. When data read from FLASH status 0 matches the rewrite completion code, the CPU 12 reads ID status 2_1 and ID status 2_2. When data for both ID status values matches the ID code, the CPU 12 reads FLASH status 1. A match for the ID code can be also confirmed when the flash memory 15 is partially rewritten.

The CPU 12 executes the determination program 22 when a reset condition occurs. When the reset condition is released, the CPU 12 can check whether the flash memory 15 is normally written. When a write is incorrect or data is determined to be garbled, the CPU 12 can stop the user program 20 to prevent it from executing abnormally.

Second Embodiment

Figure 6:
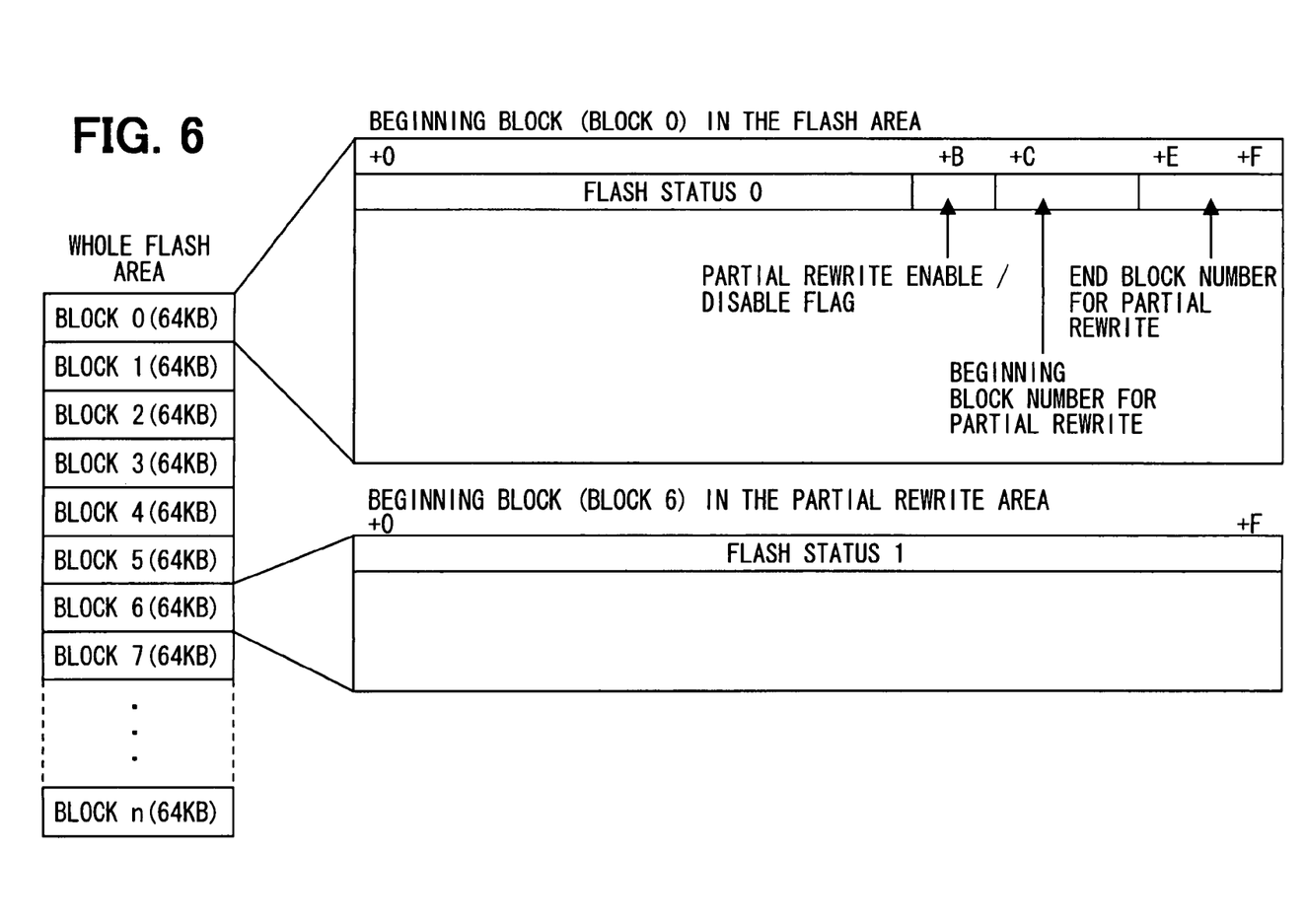
FIG. 6 is a memory map illustrating the memory contents of a flash memory in accordance with a second exemplary embodiment of the invention.

FIG. 6 through FIG. 9 show a second embodiment of the invention. The mutually corresponding parts in the first and second embodiments are designated by the same reference numerals and a description is omitted for simplicity. A description will be provided such that the differences between the first and second embodiments will be apparent. FIG. 6 shows a configuration of the areas of an exemplary flash memory in accordance with the second embodiment while FIG. 2 similarly shows areas of a flash memory in accordance with the first embodiment.

According to the second embodiment, the first 16 bytes of beginning block 0 contain FLASH status 0, the flag storage area for enabling or disabling the partial rewrite, and areas for storing beginning and an ending block numbers for the partial rewrite. Unlike the first embodiment, in accordance with the second embodiment ID areas 2 and 1 are not present and end block n is not provided with a special area. Similar to the first embodiment, block 6 is used as the beginning block for the partial rewrite and contains FLASH status 1.

The flash controller 16 writes data to the flash memory 15 in minimum units of 16 bytes. It should be noted that in a scenario where the CPU 12 writes one byte of data to the flash memory 15, the flash controller 16 checks for an error and performing a write (read-modify-write) operation if necessary in units of consecutive 16-byte data containing the address of the 1-byte data.

The effects of the second embodiment will now be described.

(Total Rewrite Process)

Figure 7:
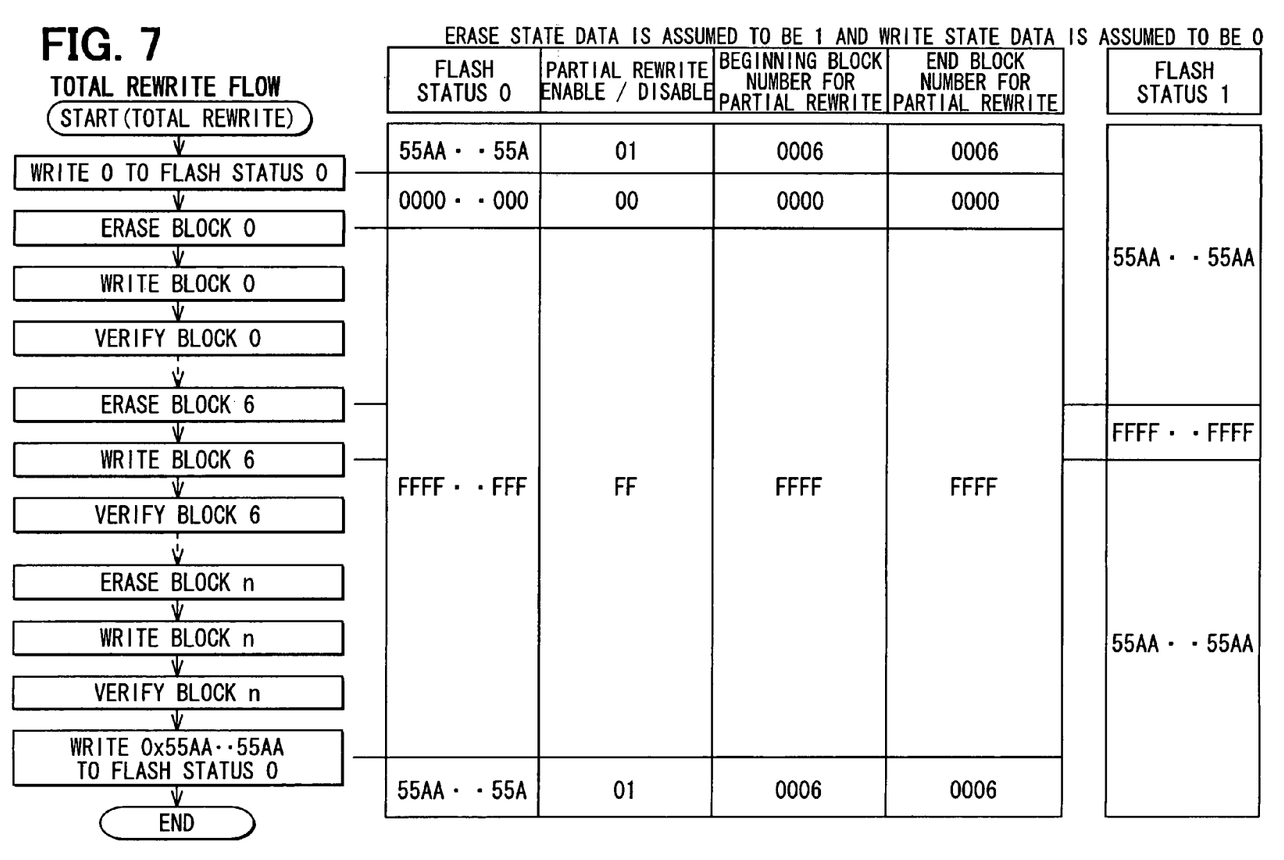
FIG. 7 is a functional diagram illustrating an exemplary total rewrite process performed by a rewrite program and associated values in the flash memory.

With reference now to FIG. 7, the total rewrite process assumes that the partial rewrite enable/disable flag contains a value of 01H, corresponding to an enabled condition, and the partial rewrite beginning and end blocks contain 0006H. The CPU 12 first writes data 0000 . . . 0000 to thereby clearing FLASH status 0 of block 0. In addition, the CPU 12 zero-fills the areas for storing the partial rewrite enable/disable flag, and the partial rewrite beginning and end blocks. Similar to the first embodiment, the CPU 12 erases, writes, and verifies blocks 0, 6, and n in that order. The CPU 12 finally writes data 55AA . . . 55AA to FLASH status 0, 01H to the partial rewrite enable/disable flag, and 0006H to the partial rewrite beginning and end blocks to complete the process. Data values for FLASH status 0 and FLASH status 1 change similarly to the first embodiment.

(Partial Rewrite Process)

Figure 8:
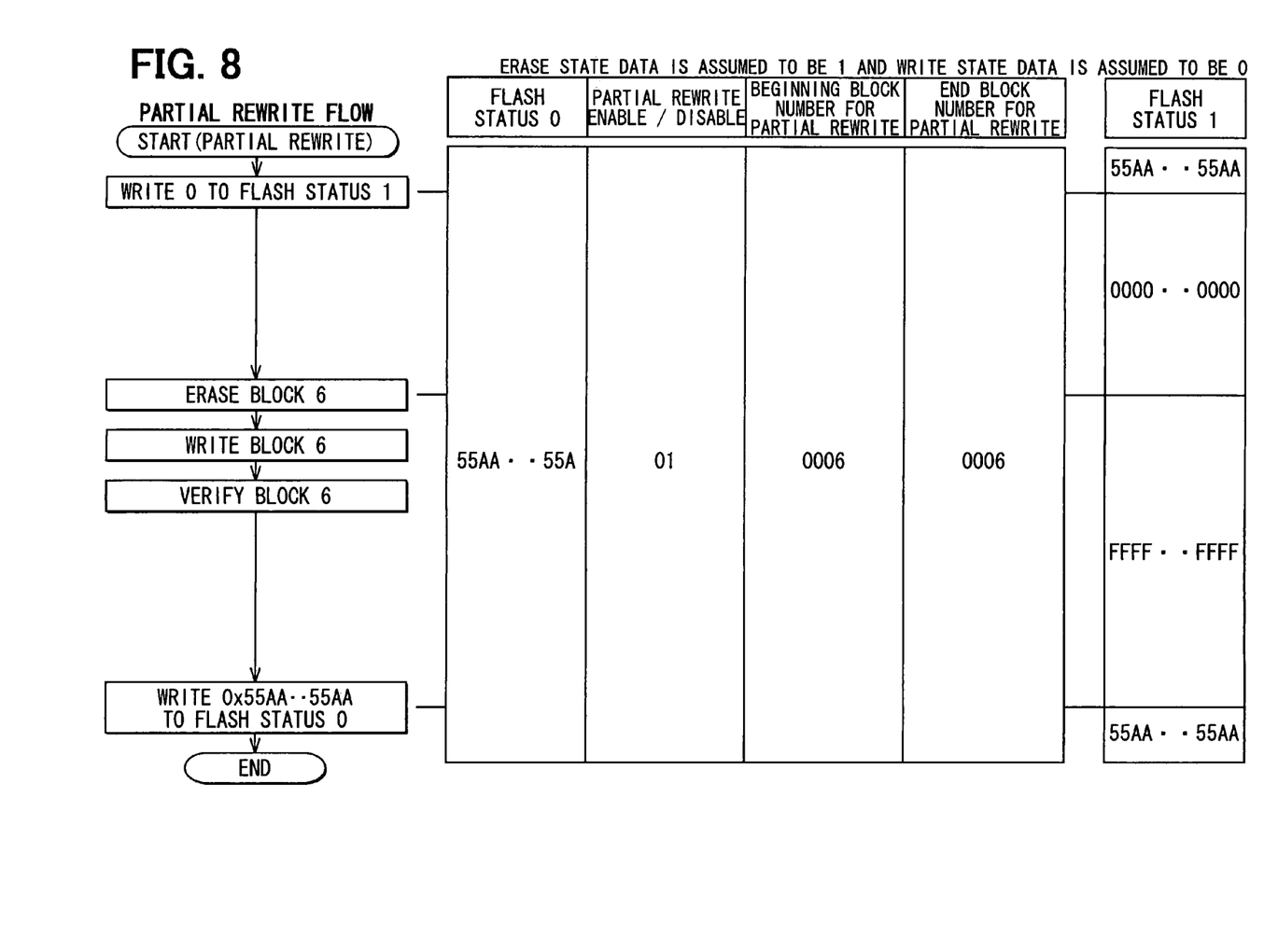
FIG. 8 is a functional diagram illustrating an exemplary partial rewrite process performed by a rewrite program and associated values of the flash memory including beginning and ending block number.

With reference now to FIG. 8, during a partial rewrite process of the flash memory 15, data values for FLASH status 1 also change exactly as described in accordance with the first embodiment. The states of FLASH status 0 and the partial rewrite enable/disable flag are unchanged. The partial rewrite beginning and end blocks maintain initial values.

Figure 9:
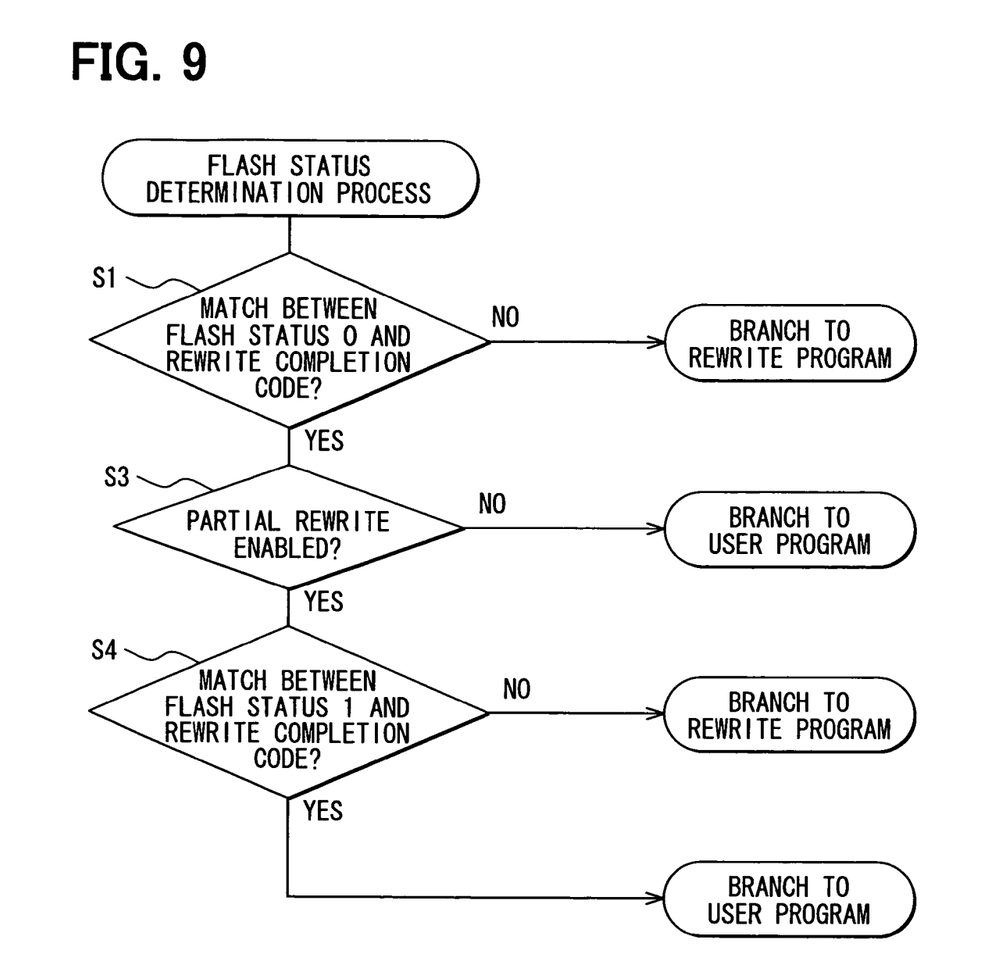
FIG. 9 is a flowchart illustrating an exemplary flash status determination process according to an alternative embodiment of the invention.

With reference to FIG. 9, a flash status determination process including exemplary procedures S1, S3 and S4 is shown. Unlike the first embodiment, which is shown, for example, in connection with FIG. 1, the second embodiment simplifies the determinations without checking whether the ID status contains a normal code.

The second embodiment uses the minimum unit of writing to the flash memory 15 as the flag storage area for storing a flag indicating the enabling or disabling the partial rewrite and the areas for storing beginning and end positions as well as a total rewrite check area. Information about the partial rewrite to the flash memory 15 becomes meaningful after the total rewrite is complete at least once. Since the minimum unit of writing is used for the partial rewrite information and the total rewrite check area, the amount of information can be reduced and effectively used. Unlike the first embodiment, the second embodiment does not check the ID code in the flash memory 15 and can complete the determination program execution in a shorter time.

It should be noted that International Publication WO 2004/031966 describes a memory including multiple blocks, each of which is provided with a flag and each of which is equivalent to a minimum erasure unit. The state of the flag is used to determine which block is erased. However, because of the time-consuming nature of checking the flag state for each block, delay is encountered when the microcomputer starts, which delay increases as the number of memory blocks increases. When the above described memory is used as data memory, a host microcomputer initializes the data memory at startup, during which a check is performed. When the above described memory is used as program memory, however, a delay in the startup due to memory processing may consequently delay the start of a program stored therein and thus of the operation of the microcomputer.

Third Embodiment

Figure 10:
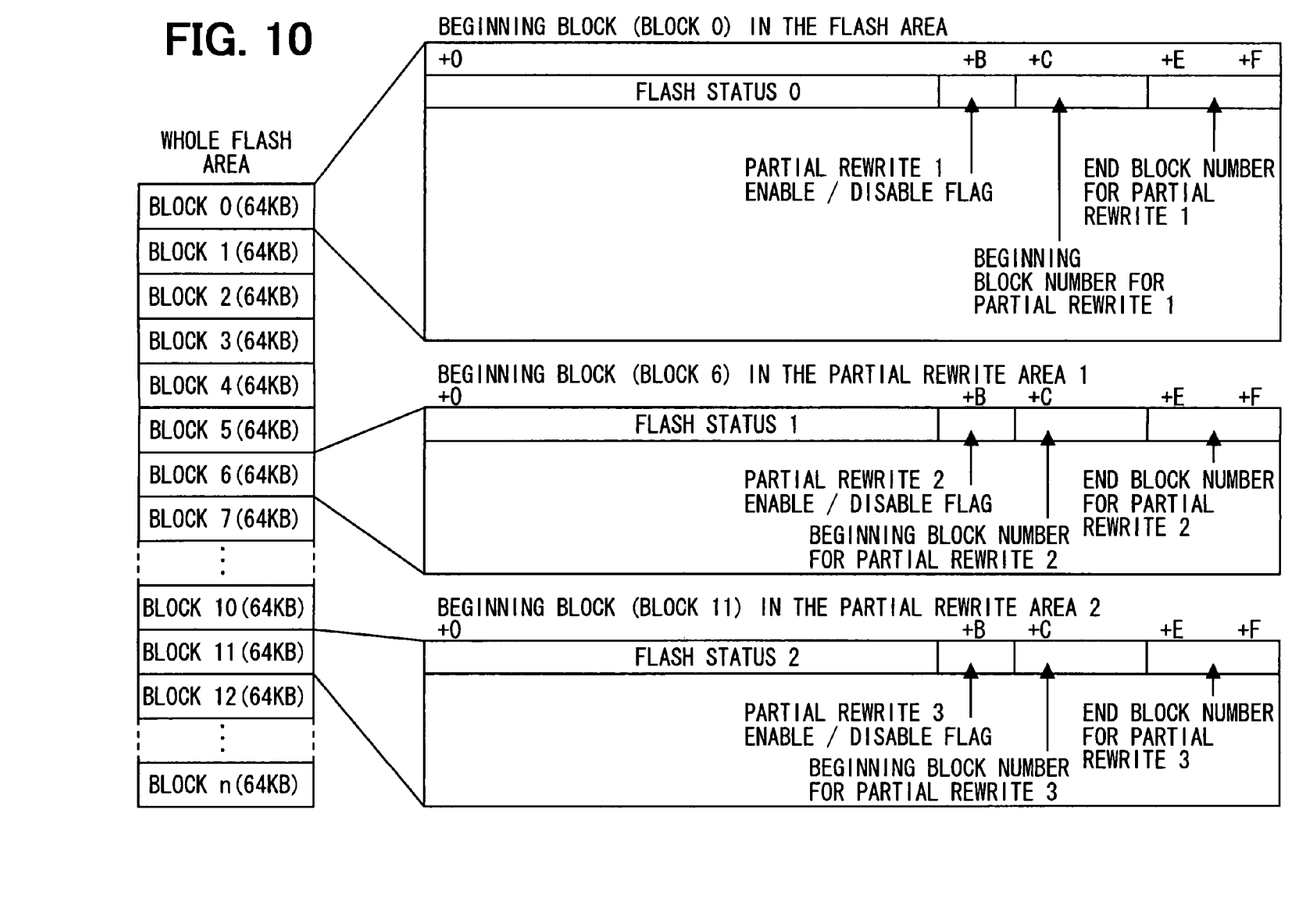
FIG. 10 is a memory map illustrating the memory contents of a flash memory in accordance with a third exemplary embodiment of the invention.
Figure 11:
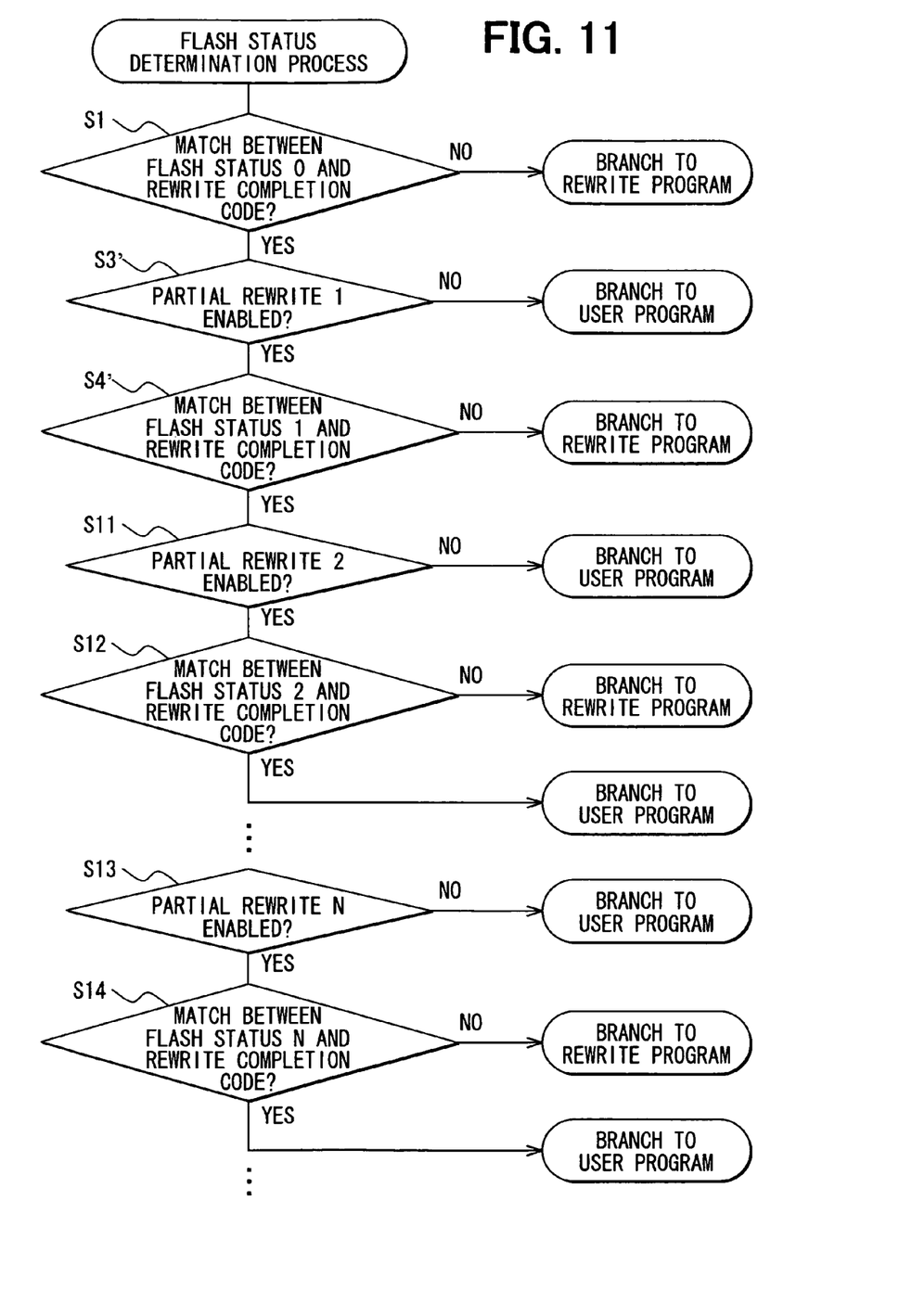
FIG. 11 is a flowchart illustrating an exemplary flash status determination process according to an alternative embodiment of the invention.

With reference to FIG. 10 and FIG. 11, a third embodiment of the invention will be described, for example, with particular attention to differences from the second embodiment. The third embodiment provides a process for multiple blocks to be partially rewritten. FIG. 10 shows two blocks 6 and 11 to be partially rewritten. FLASH status 0 of block 0 contains information for performing a partial rewrite 1 on block 6. FLASH status 1 of block 6 provides 16-byte information for performing a partial rewrite 2 on block 11. The information includes the flag storage area for enabling or disabling the partial rewrite, and areas for storing beginning and end block numbers for the partial rewrite 2.

Block 11 contains FLASH status 2 as a partial rewrite check area. FLASH status 2 provides 16-byte information for performing an additional partial rewrite 3. When the partial rewrite 3 is not performed, the partial rewrite enable/disable flag is disabled.

FIG. 11 is related to FIG. 9 in that, for example, S3 and S4 from FIG. 9 are related to S3' and S4' for the partial rewrite 1, while S11 and S12 of FIG. 11 provide determinations corresponding to the partial rewrite 2. The process shown in FIG. 11 is sufficient for partially rewriting up to two blocks. It will be appreciated that when up to three blocks need to be partially rewritten, S12 can be followed by S13 and S14 (not shown) for determinations corresponding to the partial rewrite 3, and so on, for additional partial rewrites. In the present example provided in accordance with the third embodiment, the enable/disable flag for the partial rewrite 3 as shown for example, in FIG. 10 would be disabled. An exemplary check of whether partial rewrite 3 is enabled at a S13 (not shown) would result in a determination of NO and control would be passed to the user program, for example, as in S3' and S11.

According to the third embodiment, the partial rewrite check area for block 6 provides the flag storage area for enabling or disabling the partial rewrite and the areas for storing beginning and end positions corresponding to the area to be partially rewritten next. Since one or more partial rewrite check areas are provided, the partial rewrite can be performed on multiple blocks whose addresses are discontiguous.

It should be noted that, while various exemplary and alternative exemplary embodiments have been described herein above with reference to the accompanying drawings, the invention is not limited solely to the above described embodiments, but may further be embodied in accordance with various modifications as follows.

For example, according to need, block n can be provided with the same ID area as for block 0 and can be checked twice using, for example, S5 and S6. Further, the ID code of block 0 can be checked when needed. FLASH status 0 and FLASH status 1 or ID areas 2 and 1 may be located anywhere in the flash memory 15. The rewrite completion code and the ID code, described, for example, as being a value of 55AA or the like, can be any data value. Block 0 may be partially rewritten. The block size of the flash memory 15 may be a size other than 64 kilobytes. The first memory can be rewritten in units other than blocks. During a rewrite, the verification process may comply with memory specifications. The determination of whether codes are normal, for example, at S2 may or may not be performed. The partial rewrite process may be performed any time when needed according to requirements or specifications. The rewritten data 24 is not necessarily transferred to the RAM 14 at a time. The CPU 12 may sequentially rewrite the RAM 14 by receiving data transmitted from the rewriting apparatus 23.

In accordance with still other modifications, the microcomputer 11 may be capable of entering a low-power consumption mode such as a wait mode, a sleep mode, a stop mode, or the like, in which operation of the microcomputer 11 is suspended, for example, by suspending the operation clock. In such an example, the CPU 12 may execute the determination program 22 when the low-power consumption mode is released to enable a wake-up state. At the wake-up time, the CPU 12 can check whether the flash memory 15 is normally written. When a write is incorrect or data is garbled, the CPU 12 can stop the user program 20 to prevent it from executing abnormally. The minimum write unit is not limited to 16 bytes and may be changed in accordance with microcomputer, system or application specifications or the like. The flash controller 16 may or may not be provided according to need. The CPU 12 may directly write to the flash memory 15. In the second and third embodiments, the total size of FLASH status 0, FLASH status 1, and the like, and the information about the partial rewrite may be smaller than the minimum write unit.

Still further, the invention is applicable to not only a microcomputer included in an ECU for vehicle control but is also applicable to any microcomputer having rewritable nonvolatile memory.

What is claimed is:

1. A microcomputer comprising:
   first rewritable nonvolatile memory that stores an user program, the first rewritable nonvolatile memory divided into blocks having a first predetermined size, the blocks of the first rewritable nonvolatile memory being written to in accordance with a minimum write unit having a second predetermined size, a first area of a first block of the first rewritable nonvolatile memory allocated for storing first data associated with a predetermined total rewrite completion code, a next area of the first block for storing a first flag to enable or disable a partial rewrite of the first rewritable nonvolatile memory, a beginning position and an end position of the partial rewrite area in a second block of the first rewritable nonvolatile memory, the combination of the first area and the next area having a size equal to the minimum write unit, and a first area of the second block for storing second data associated with a predetermined partial rewrite completion code;
   second memory that stores a rewrite program for causing one of a total rewrite of the first rewritable nonvolatile memory and the partial rewrite of the first rewritable nonvolatile memory to be performed and a determination program for determining whether the one of the total rewrite and the partial rewrite of the first rewritable nonvolatile memory should be performed; and a CPU that reads and executes one or more of the user program, the rewrite program and the determination program, wherein the CPU executes the determination program having instructions of:

reading the first area of the first block of the first rewritable nonvolatile memory; and executing the rewrite program for performing the total rewrite if the first data read from the first area does not match the predetermined total rewrite completion code, wherein the rewrite program for performing the total rewrite has instructions of:

clearing a total area of the first rewritable nonvolatile memory;

rewriting the total area of the first rewritable nonvolatile memory; and writing the predetermined total rewrite completion code as the first data in the first area, wherein the determination program further has instructions of:

reading the first flag in the next area if the data read from the first area matches the predetermined total rewrite completion code, reading the beginning position if the first flag enables the partial rewrite;

reading the second data in the first area of the second block; and executing the rewrite program for performing the partial rewrite if the second data does not match the predetermined partial rewrite completion code, wherein the rewrite program for performing the partial rewrite has instructions of:

clearing the partial rewrite area based on the beginning position and the end position;

rewriting the partial rewrite area; and writing the predetermined partial rewrite completion code in the first area of the second block.

2. The microcomputer of claim 1, wherein:

the second block includes a next area for storing a second flag to enable or disable an additional partial rewrite of a second partial rewrite area and a second beginning and a second end position of the second partial rewrite area in a third block to be partially written;

the combination of the first area of the second block and the next area of the second block has a size equal to the minimum write unit; and a first area of the third block is for storing third data associated with the predetermined partial rewrite completion code.

3. The microcomputer of claim 1, wherein the CPU executes the determination program at reset time.

4. The microcomputer of claim 1, wherein the CPU executes the determination program when a low-power consumption mode is released.

5. A method for rewriting an user program into a nonvolatile memory associated with a computer system, the method comprising:

dividing the nonvolatile memory into a plurality of blocks having a first predetermined size, a first one of the plurality of blocks having a first area of a second predetermined size, the first area storing information associated with the rewriting of the user program, the user program stored in remaining areas of one or more of the plurality of blocks;

reading the first area to determine whether a rewriting of the nonvolatile memory is required; and rewriting an application into the nonvolatile memory if the reading the first area determines that the rewriting is necessary, wherein the information includes a total rewrite status value, a partial rewrite enable flag, a partial rewrite beginning location and a partial rewrite ending location, the partial rewrite beginning location configured to coincide with a block boundary of a second one of the plurality of blocks, the second one having a second first area the second first area storing information associated with a partial rewriting the user program including a partial rewrite status value;

the reading the first area includes:

reading the total rewrite status value; and determining if the total rewrite status value equals a total rewrite complete value;

the rewriting includes rewriting the application into the nonvolatile memory if the total rewrite status value does not equal a total rewrite completion value; and the rewriting includes at partially rewriting the application into the nonvolatile memory starting at the partial rewrite beginning location and ending at the partial rewrite ending location if the total rewrite status value equals a total rewrite complete value, the partial rewrite enable flag indicates that a partial rewrite is enabled, and the partial rewrite status value does not equal a partial rewrite complete value.

6. A method according to claim 5, wherein an end one of the plurality of blocks includes a third area for storing information including an identifier for the user program and an authentication value associated with the user program.

7. A method according to claim 6, wherein the rewriting is performed only if the authentication value is successfully verified.

8. A method according to claim 5, wherein the nonvolatile memory includes a flash memory unit.

9. A method according to claim 5, wherein the first predetermined size includes 64 KB and the second predetermined size includes 16 B.

* * * * *